Patented Feb. 24, 1942

2,274,272

UNITED STATES PATENT OFFICE 2,274,272

LUMINESCENT MATERIAL

Humboldt W. Leverenz, Collingswood, N. J., assignor to Radio Corporation of America, a corporation of Delaware No Drawing. Application May 24, 1939.
Serial No. 275,475

9 Claims. (Cl. 250—81)

This invention relates to a process for synthesizing luminescent materials, and in particular, is directed to producing luminescent materials of improved properties with the further advantage that the spectral luminosity of the resultant material may be controlled at the time of manufacture.

This invention is related to the invention described in my issued Patent No. 2,118,091 for "Luminescent materials" which issued May 24, 1938, and constitutes improvements thereon, since my new invention makes the process of manufacture of improved luminescent materials easier, while at the same time, the resultant luminescent material has greater efficiency and longer phosphorescence.

The present invention is concerned with luminescent materials which are not only applicable to excitation under ultra-violet light and cathode ray bombardment, but are also highly useful in gaseous discharge types of tubes for use in general illumination work.

The materials which are prepared according to my new method are of such type and characteristics which, while they retain the desirable characteristics of the materials produced in accordance with the process described in the above identified patent, have the further desirable properties of having increased efficiency and longer phosphorescence. At the same time, the method of preparing the materials has been simplified.

It will be appreciated that these features, combined with the material's high resistance to burning under cathode ray bombardment and substantially invariant spectral distribution both with intensity and duration of the irradiation by whatever type of radiant energy, constitute important improvements both in the method of preparing and the material itself.

Accordingly, it is one of the purposes of my invention to provide a luminescent material whose spectral emission may be modified from one end of the spectrum to the other in all the intermediate wave lengths thereof by changing the proportions of the material entering into the synthesis of the finally prepared luminescent material.

Likewise it is one of the purposes of my invention to provide a luminescent material whose spectral emission may be modified by controlling the temperature and duration of the heating of the luminescent product during its preparation.

A further object of my invention is to modify the emission spectrum from the violet end toward longer wave lengths up to and including the red end by isomorphic mutual replacements in the crystal lattice of the resultant luminescent material.

Another object of my invention is to prepare a material which will emit light of high intensity under radiant energy such as cathode ray bombardment, ionic discharge, and ultra-violet light.

A still further object of my invention is to provide a process for synthesizing a luminescent material with substantially invariant spectral distribution with regard to length of time of irradiation by radiant energy such as cathode ray bombardment, ionic discharge, or ultra-violet light for example.

A still further object of my invention is to provide a process whereby improved luminescent materials may be prepared with minimum expense but, nevertheless materials may be prepared uniformly superior response characteristics.

Moreover, as another object of my invention, there is provided a process for synthesizing luminescent materials which have increased efficiency of conversion of the irradiating radiant energy into light energy.

Again, it is the purpose of my process, as a further object of the invention, to provide a luminescent material having a longer phosphorescent period and means for controlling the length of the phosphorescent period.

Another important object of my invention is to simplify the process for synthesizing improved luminescent materials.

Other objects and advantages of my invention will be immediately apparent to those skilled in the art upon reading the following description of my invention.

The luminescent material resulting from my material is a silicate activated by manganese, in which there is an isomorphic mutual replacement of beryllium and zinc and in which the silica is present in non-stoichiometric proportions compared with the molar sum of beryllium and zinc.

In my above identified patent, I describe the process and material in which silicon was present in molecular or stoichiometric proportions, as compared with the molar sum of beryllium and zinc. My new invention, however, is concerned with those beryllium zinc silicates in which non-stoichiometric proportions are used. As a result of the non-stoichiometric proportions, the efficiency of conversion of the impinging radiant energy into light energy is increased on the order of 15%, while at the same time, there is obtained a longer period of phosphorescence than that provided by the luminescent material prepared from molecular proportions. Moreover, the ease of preparation of the material is enhanced since I have discovered that by using excess silica over that required for molecular or ortho proportions, the spectral response is changed only slightly so that it is no longer necessary to control the amount of silica used in the process as carefully as was necessary in the past.

It will be appreciated that in the process of manufacturing the luminescent materials, where relatively high temperatures are used, it becomes a rather difficult problem to make sure that the original proportions of the mixed materials are maintained.

In my new process, where excess silica is provided, the same precautions are not necessary for two reasons. The deviations in combined silica which result from a slight variation in proportion of reacted components affect the spectral response to a negligible degree. In the same way, any slight losses resulting from processing or heating are equally ineffective. The whole process, therefore, of synthesizing the material is considerably simplified.

In the course of preparing the material germanium may be substituted in whole or in part for the silicon. With such material and starting with the greatest ratio of zinc to beryllium, the color of the resultant luminosity under radiant energy will be a green blue. As the ratio of zinc to beryllium is made smaller and smaller, the color changes from green blue to green through yellow to orange red. Changing the amount of the activator manganese changes the color to almost as great a degree and controls to some extent, the intensity of the resultant luminosity, and I have found that an optimum condition prevails when the amount of manganese is approximately .006 molal with respect to the total metallic ions molality. Increasing the final heating temperature also shifts the emission spectrum toward the red. Further shift toward the red may be obtained by substituting germanium for silicon.

Increasing the amount of silicon over that necessary to give molecular proportions compared to the molar sum of beryllium and zinc results in increased efficiency and if the material is to be used primarily for excitation by ultra-violet light, then the excess silica should be on the order of 100% over that necessary for molecular proportions. For optimum efficiency under cathode ray bombardment, the excess silica should be on the order of from 10% to 75%, while for excitation by ionic discharge devices of the gaseous discharge type, such as in lamps in which rare gas is subjected to electrical potentials or electric fields, the excess silica may run as high as 300% to give optimum efficiency, depending upon the material through which the ionic discharge takes place.

In using these proportions, the efficiency is increased on the order of 15% over that efficiency given by materials made in accordance with the process described in my above identified patent. The duration of phosphorescence is increased approximately 30%.

It will thus be appreciated that my new process calls for providing an excess amount of silica over that necessary to give molecular proportions and that by so doing, I attain the objects enumerated above.

My new material may be prepared by precipitating beryllium carbonate, zinc carbonate, and manganese carbonate, in chosen proportions from an exceedingly pure nitrate solution of these metals by adding exceedingly pure ammonium carbonate. The mixed material is then precipitated on and around very finely divided, exceedingly pure silica ($SiO_2$) particles. The silica particles may be provided in any suitable fashion such as a suspension or, if it is preferred, a colloidal suspension of silica may be used. Likewise, it is not necessary to use silica. Germanium oxide may be substituted for silica and still give the superior luminescent materials which my invention provides.

The precipitated mixture is then evaporated to dryness with stirring and heated for about one hour in a dry condition at heats varying between 700°–1600° C. in an electric furnace with an optimum value of substantially 1150° C.

The steps in the process of mixing, precipitating, heating and final grinding the resulting luminescent material, as a ball-mill, for example, have already been described in detail by my copending application entitled "Process for synthesizing luminescent material," Serial No. 707,866, filed January 23, 1934, in which I have described the preparation of a manganese activated zinc ortho-silicate. For example, to prepare a luminescent material having 40 molar percent of beryllium and 60 molar precent of zinc (with respect to the total cation content) and activated with .006 molal manganese, the following procedure may be used:

Into a clean quartz beaker from 4.1 to 12 grams of purified anhydrous silicon dioxide is added, the amount depending upon whether optimum efficiency is desired for ultra-violet, gaseous discharge, or cathode ray irradiation. To this is added 26.3 ml. of 2 molal beryllium nitrate of the greatest purity obtainable. There is further added to this 21.4 ml. of 3.68 molal zinc nitrate prepared from spectroscopically pure New Jersey zinc. The mixture is boiled and stirred. When brought to a boil, there is added very slowly and carefully with plenty of agitation 70 ml. of saturated (approximately 5 molal) ammonium carbonate solution. The contents of the beaker are then evaporated with stirring to dryness and then heated by any appropriate manner to red heat. The contents are then allowed to cool and ground and mixed with a quartz rod. Approximately 5½ grams of the resulting product is placed in a quartz crucible and added to it 1.66 ml. of .2206 molal manganese nitrate of the greatest purity obtainable. 3 to 5 ml. of quartz distilled water is then added, the exact quantity depending upon the amount required to make the mixture thoroughly wet. The crucible is then heated and the contents thereof stirred and then 3 ml. of concentrated ammonium carbonate is added.

The contents of the crucible are then evaporated with stirring to dryness and upon cooling the contents are ground with a quartz rod. The contents are then transferred to a covered crucible and heated to 1200° C. in a suitable furnace for about 60 minutes. The crucible is then removed and allowed to cool in the air. The final product is a lightly fritted, easily comminutable white cake which gives an intense pale, canary yellow cathodoluminescence. It will be appreciated that the values given above are for a 40% beryllium—60% zinc phosphor, but it should be noted that the proportions of beryllium and zinc nitrate may be varied so long as molal quantities are preserved in accordance with the conditions pointed out above, and of course, that the quantity of manganese nitrate may also be varied. In the preparation of a luminescent material, the various ingredients used must be of exceptional purity in order that the characteristics of the final product shall be under the operator's control. This particular feature has been clearly pointed out in my copending application referred to above.

I have sometimes used slightly lower temperatures in preparing manganese activated silicates of non-molecular proportion than those temperatures which are used for preparing such silicates of molecular proportion. As pointed out in my above identified patent, the spectral response can be controlled to some degree by the temperature selected and for a specific application, I have used the same temperatures for my non-molecular silicates as I used for my molecular ones.

The resultant material will be found to have increased efficiency and an increase in phosphorescent time on the order of 40% over luminescent materials prepared from molecular proportions of the silicate. The actual increase in phosphorescent time which is extremely desirable where the material is used as a coating for electric gas discharge lamps, can be varied by the actual percent of excess silica as well as the temperatures used in processing the material.

It will be readily appreciated that my newly invented material manganese activated beryllium zinc silicate of non-molecular proportions is an improvement over the now known manganese activated beryllium zinc silicate of molecular proportions, since it is now possible to obtain increased efficiency of conversion of one form of energy into another, together with increased phosphorescent time and ease of preparation.

It will be appreciated that my new material may be prepared by heating non-stoichiometric proportions of zinc oxide, beryllium oxide, silicon oxide and manganese oxide in a suitable furnace to effect a final combination which is a manganese activated zinc beryllium silicate of non-stoichiometric proportions.

As pointed out in my above identified application, the beneficial features of being able to control the spectral response of the material, together with the non-"burning" properties and the fact that platinum-ware is not necessary in the preparation of the material, have been retained. Consequently, my improved process and material make possible the more efficient production of light and so improve production of television tubes where the material is used in a cathode ray oscilloscope, as well as providing more efficient light sources for general illumination work where the material is used to coat an electric gaseous discharge tube.

As pointed out in the above identified patent, my improved luminescent material may be mixed with other phosphors to give white light, and in addition, if it is desired to increase the secondary electron emission of my new material, this may be done as also described in the above-identified patent by mixing small amounts of barium, strontium, calcium, caesium, rubidium, lanthanum, cerium, thorium, any of their compounds, or other elements or their compounds, which have large ionic or atomic radii. In certain applications of luminescent material, it is desirable to have high secondary emission and by mixing small amounts of the above-identified materials, this desirable feature can be readily obtained.

Having described my invention, what I claim is:

1. In the process of manufacturing luminescent materials of the silicate type, the step of adding silica in excess of the quantity required to give stoichiometric proportions.

2. A luminescent material consisting of a manganese activated beryllium zinc silicate having from 2.5% to 300% excess silicon over that required to give stoichiometric proportions.

3. A luminescent material consisting of a manganese activated beryllium zinc germanate having from 2.5% to 300% excess germanium over that required to give stoichiometric proportions.

4. A luminescent material consisting of a manganese activated beryllium zinc silicate of non-stoichiometric proportions, said non-stoichiometric proportions resulting from an excess of silicon.

5. A luminescent material consisting of a manganese activated beryllium, zinc, and oxygen combination of non-stoichiometric proportions with an element of the group consisting of silicon and germanium, said non-stoichiometric proportions resulting from an excess of said element.

6. A luminescent material consisting of a manganese activated beryllium zinc germanate of non-stoichiometric proportions, said non-stoichiometric proportions resulting from an excess of germanium.

7. A luminescent material with high secondary electron emission consisting of a manganese activated beryllium, zinc, and oxygen combination of non-stoichiometric proportions with an element chosen from the group consisting of silicon and germanium, said non-stoichiometric proportions resulting from an excess of said element, and an element having an atomic radius equal to or larger than thorium and a work function equal to or smaller than thorium.

8. In the process of preparing a manganese activated beryllium, zinc and oxygen compound with an element chosen from the group consisting of silicon and germanium the step which includes adding an excess of the said element over that required to give stoichiometric proportions.

9. A luminescent material consisting of a manganese activated beryllium, zinc, and oxygen combination with an element chosen from the group consisting of silicon and germanium comprising an excess of the said element over the quantity required for molecular proportion, said excess lying in the range from substantially 2.5% to 300% of the quantity of the said element required for molecular proportion.

HUMBOLDT W. LEVERENZ.